Dec. 10, 1963  H. J. SCHWERDHÖFER  3,113,652
DUAL SPEED COASTER HUB
Filed March 9, 1962

INVENTOR
Hans Joachim Schwerdhöfer

United States Patent Office 3,113,652
Patented Dec. 10, 1963

3,113,652
DUAL SPEED COASTER HUB
Hans Joachim Schwerdhöfer, Schweinfurt (Main), Germany, assignor to Fichtel & Sachs A.G., Schweinfurt (Main), Germany, a corporation of Germany
Filed Mar. 9, 1962, Ser. No. 178,761
Claims priority, application Germany Mar. 11, 1961
16 Claims. (Cl. 192—6)

This invention relates to free-wheeling hubs for bicycles and the like, and more particularly to hubs permitting transmission of driving force to a wheel at two different transmission ratios, and braking of the wheel by means of a brake arrangement provided within the hub. Such hubs are known as multiple-speed coaster hubs. This invention is primarily concerned with a dual-speed coaster hub.

In known dual-speed coaster hubs, a hub shell is rotatable on a stationary axle suitably squipped to permit mounting in the rear fork of a bicycle frame. The hub shell has wire spokes fastened thereto which support the wheel rim. A driver member is rotatable on the shaft and is partly enveloped by the hub shell. The portion of the driver member projecting from the hub shell carries a sprocket wheel over which a drive chain is trained. Rotation of the driver member in one direction actuates forward movement of the wheel. Rotation of the driver member in the opposite direction causes simultaneous engagement of an internal brake mechanism with the hub shell and the shaft so that wheel movement is stopped.

The multiple transmission ratio between the driver member and the hub shell may be obtained by means of planetary gearing consisting essentially of a sun gear, a plurality of planet gears mounted on a planet carrier coaxial with the sun gear, and a ring gear engaged by the planet gears while they also mesh with the sun gear. Speed changes are brought about by selectively coupling the driver member with different elements of the planetary gearing. The ring gear and the hub shell carry respective members of a ratchet which permits free-wheeling and driving engagement of the planetary gearing with the shell.

Shifting from one speed into the other one in a conventional dual-speed coaster hub requires axial movement of one of the meshing elements of the planetary gearing relative to the other. A corresponding speed shift is not possible in those three-speed hubs which are commonly employed now so that parts of conventional dual-speed hubs are not interchangeable with those of three-speed hubs in which the axial position of the planetary gearing elements is fixed. Space in a bicycle hub is valuable and it would not be practical to equip such conventional three-speed hubs with gear elements of an axial length sufficient to permit their axial movement without loss of meshing engagement with cooperating other gear elements.

It is a well-known undesirable property of certain coaster hubs, that their brakes tend to block when the bicycle is first braked to a standstill, and then rolled back manually while the pedals are idle. Such blocking of the coaster brake does not occur every time when braking is followed by backward rolling, but it happens frequently enough to cause inconvenience to the rider.

An important object of this invention is the provision of a dual-speed coaster hub which avoids axial movement of gear elements during speed changes, and is thus capable of being assembled from parts many of which also are useful in the usual triple-speed hubs, thereby reducing the number of spare parts to be stocked for the manufacturer and repair of such bicycle hubs.

Another object is the avoidance of brake blocking when a bicycle equipped with a coaster hub is rolled backward after having being braked by back-pedaling.

With these and other objects in view, as will hereinafter more fully appear, and will be more particularly pointed out in the appended claims, reference is now made to the following description of a preferred embodiment of the dual-speed coaster hub of the invention in connection with the accompanying drawings in which:

Figure 1:
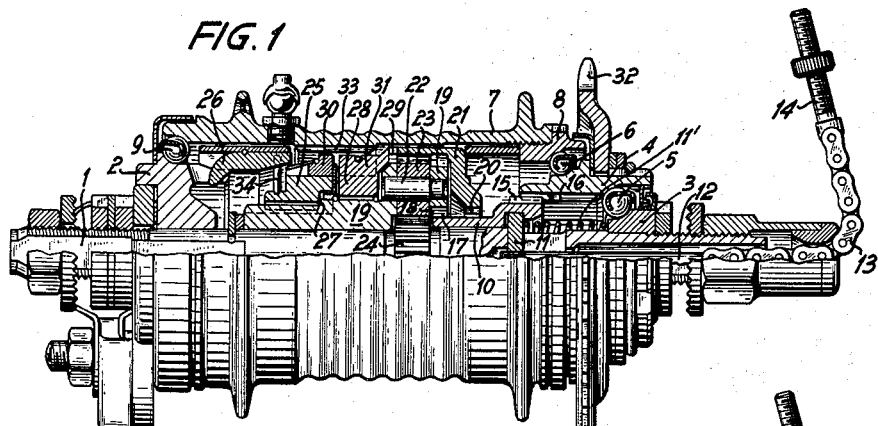
FIG. 1 shows a bicycle hub in an elevational view, one half of the hub being shown in section on an axial plane to reveal the working elements thereof.

Referring now ot the drawing in detail, and initially to FIG. 1, there is seen a stationary shaft 1 equipped to be mounted on the rear fork of a bicycle frame. Bearing elements 2 and 3 threadedly engage the axial end portions of the shaft 1, and their axial position is adjustably fixed. A tubular driver member 4 is supported at one end thereof on the bearing element 3 by means of a ball bearing 5, and itself supports one axial end of the shell 7 of the hub by means of a ball bearing 6 and of an annular bearing race member 8 which is threadedly attached to the hub shell 7. A ball bearing 9 on the bearing element 2 supports the other end of the hub shell 7. A sprocket 32 is mounted on the driver member 4, and is accessible for having a drive chain trained thereover.

For the sake of convenience, the end of shaft 1 adjacent the bearing element 3 and the ball bearing 5 will be referred to hereinafter as the "drive end" of the shaft whereas the other shaft end will be referred to as the "brake end." This terminology will be applied in an analogous manner to other elements of the hub to denote spatial relationships relative to the shaft axis.

The brake end of the driver member 4 is supported on a coupling sleeve 10 which is rotatable and axially slidable on the shaft 1. The sleeve has an annular recess open toward the axis of the shaft 1. This recess is engaged by a sliding block 11 movably received in a corresponding axial slot of the shaft 1. A helical return spring 11' abuts against the bearing element 3 and the block 11 and tends to move the sleeve 10 toward the brake end of the shaft 1.

The drive end of the shaft 1 has an axial bore in which a rod 12 is slidable. One end of the rod is fastened to the block 11, the other end to a chain 13. The chain extends outward of the axial bore of the shaft 1, and is fastened to a Bowden cable or other linkage under the control of a bicycle rider in a well known manner. Only the terminal portion 14 of this linkage is seen in FIG. 1.

The drive end of the coupling sleeve 10 carries an external gear rim 15 meshing with an internal gear rim 16 on the driver member 4. The teeth of both gear rims are axially elongated to permit relative axial movement of the driver member 4 and of the coupling sleeve 10 without loss of meshing engagement. In the position illustrated in FIG. 1, the brake end of the coupling sleeve 10 which carries gear teeth 17, is in meshing enagement with corresponding gear teeth 18 which project radially inward from a planet carrier 19. The teeth 17, 18 are of relatively small axial length so that the teeth are disengaged when the sleeve 10 is moved toward the drive end of the shaft 1 against the force of the return spring 11' by the chain 13.

The planet carrier 19 is one element of the planetary gearing of the hub which also includes an internally geared ring 21 and a sun gear 24. Pins 22 on the planet carrier 19 rotatably support the planet gears 23 which simultaneously mesh with the ring gear 21 and with the sun gear 24. The number of planet gears is not critical. Three are preferably provided, and only one of the three is visible in FIG. 1. The sun gear 24, planet carrier 19, and ring gear 21 are coaxial with the shaft 1, and with all other rotatable elements of the hub assembly which are supported on the shaft except for the planet gears 23. The meshing elements of the planetary gearing are axially fixed and rotate in a common plane.

The planet carrier 19 has an integral tubular hub which extends from the other elements of planetary gearing toward the brake end of the shaft 1. The free end portion of the planet carrier hub is externally threaded. The threads are of rectangular sectional shape and engage corresponding internal square threads on a brake actuating member 25. The member 25 has a conical face which is adapted to expand a slotted brake sleeve 26 in a known manner. The sleeve is fastened to the shaft 1 by means of the bearing element 2. When the member 25 moves on its threads from the inoperative position shown in FIG. 1 toward the operative position adjacent the brake end of the shaft 1, its conical face engages the brake sleeve 26 and radially expands it until it abuts against the internal wall of the hub shell 7, thereby slowing, and eventually arresting rotation of the hub shell 7 about the shaft 1. In the inoperative position shown in FIG. 1, the brake actuating member 25 abuts against a shoulder 27 on the planet carrier 19. Its rotary movements relative to the shaft 1 are impeded by frictional engagement with a leaf spring 34 fastened to the brake sleeve 26.

Figure 2:
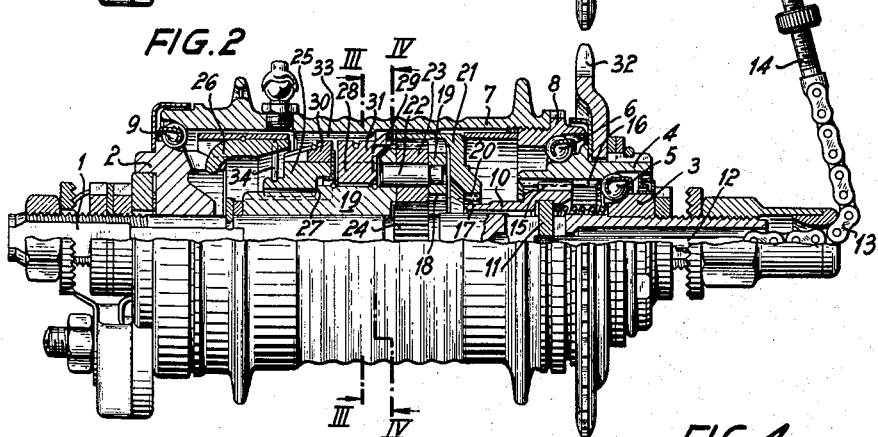
FIG. 2 shows the hub of FIG. 1 in a corresponding view, but with the working elements of the hub set for a different speed.

On the central portion of the planet carrier hub, an annular pawl carrier 28 is freely rotatable between the other working elements of the planetary gearing and the brake actuating member 25. Coupling claws 29 axially projecting on the ring gear 21 enter corresponding peripheral recesses in the pawl carrier 28 as best seen in FIG. 2. The circumferential length of these recesses is substantially greater than the circumferential length of the corresponding claws 29, thus permitting relative movement of the ring gear 21 and of the pawl carrier 28 through an angle α at each reversal of the direction of relative movement of the ring gear 21 and of the pawl carrier 28 before one is taken along by the other. The loose engagement of the coupling claws 29 in the recesses of the pawl carrier 28 thus provides a lost motion connection between elements respectively secured to the pawl carrier and the ring gear. While two coupling claws 29 and an equal number of corresponding recesses in symmetrical arrangement about the axis of the shaft 1 have been illustrated, the number of coupling claws and recesses may be varied to suit specific conditions.

Figure 3:
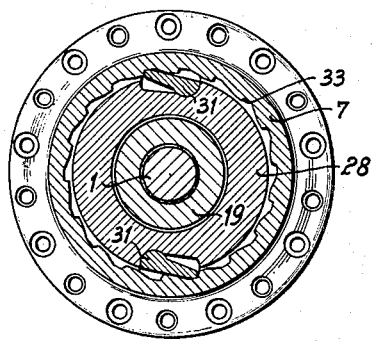
FIG. 3 illustrates the hub of FIG. 2 in radial section on the line III—III.
Figure 4:
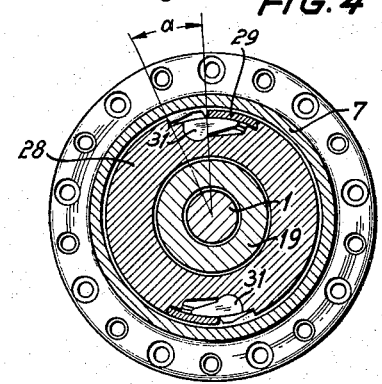
FIG. 4 is another radially sectional view of the hub of FIG. 4 taken on the line IV—IV.

The pawl carrier 28 carries two pawls 31 which cooperate with an internally toothed ratchet wheel or gear 33 on the hub shell 7. The pawls 31 are urged by non-illustrated pawl springs into engagement with the ratchet teeth of the gear 33 which are inclined in such a direction as to permit free-wheeling forward movement of the hub and of the wheel to which it pertains while transmitting driving power from the pawl carrier 28 to the ratchet gear 33 for power-driven forward movement of the hub, the wheel, and the bicycle. Manufacture of the pawl carrier is simplified if the number of pawls and of claw-receiving recesses is equal, and if the pawls are located adjacent the recesses as is shown in FIGS. 3 and 4, but other arrangements may be selected if desirable without departing from the spirit of this invention.

A similar pair of pawls 30 is mounted on the brake actuating member 25 and engages an axial portion of the ratchet gear 33. As seen from FIG. 1, the pawls 30 and 31 are axially juxtaposed and rotatable relative to each other in respective planes about the axis of the shaft 1. The pawls 31 with the corresponding portion of the ratchet wheel 33 constitute a drive ratchet for transmitting driving power from the sprocket 32 to the hub shell 7. The pawls 30 cooperate with another integral portion of the ratchet gear 33 to constitute a brake-release ratchet the functions of which will presently become apparent. For brevity, this ratchet will be referred to as "brake ratchet."

While FIG. 1 shows the dual-speed hub set for overdrive in which the hub shell 7 revolves more than once during each revolution of the sprocket 32, the hub is illustrated in FIG. 2 in its lower speed setting in which the rotary speeds of the hub shell 7 and of the sprocket 32 are equal. In this position, the coupling sleeve 10 is disposed closer to the drive end of the shaft 1 so that its teeth 17 are in driving engagement with an internal gear rim 20 on an extension of the ring gear 21. Nothing else is changed in the arrangement of the internal elements of the dual-speed hub.

The afore-described coaster hub operates as follows:

Referring first to the hub in the overdrive position of FIG. 1, driving rotation of the sprocket 32 is transmitted by the driver member 4 and the gear rims 15, 16 to the coupling sleeve 10. The teeth 17 of the latter engage the teeth 18 of the planet carrier 19. The planet gears 23 travel along the circumference of the stationary sun wheel 24 at a speed equal to that of the sprocket 32. The speed of their circumferential portions meshing with the ring gear 21 is higher, and is transmitted to the ring gear. The loose coupling constituted by the claws 29 transmits the motion of the ring gear 21 to the drive ratchet 31, 33 and thus to the hub shell 7.

The brake actuating member 25 is held axially against the shoulder 27 by the action of the spring 34 as long as the driver member 4 rotates in the direction for forward movement of the bicycle. The member 25 thus rotates with the planet carrier 19 at a speed which is lower than that of the drive ratchet and of the hub shell 7. The ratchet gear 33 overtravels the brake pawls 30 which rotate at a lower speed.

When the direction of rotation of the sprocket 32 and of the driver member 4 is reversed by back-pedaling, the spring 34 causes the brake actuating member 25 to move threadedly on the planet carrier 19 toward the brake end of the shaft 1, and to spread radially the brake sleeve 26. Frictional contact between the sleeve 26 and the internal wall of the hub shell 7 slows and finally arrests movement of the hub shell about the shaft 1.

In the absence of the loose claw coupling provided by the claws 29 and the cooperating recesses in the pawl carrier 28, and in the absence of the brake ratchet 30, 33, the engaged brake may be blocked during subsequent backward movement of the bicycle while the driver member 4 is stationary. Such blocking will follow if the free ends of the drive pawls 31 happen to abut against the walls of notches in the ratchet gear 33. In this position, backward movement of the bicycle would cause further movement of the brake actuating member 25 and blocking of the brake.

This cannot happen in the dual speed coaster hub of the invention due to the brake ratchet 30, 33 and to the lost motion connection between the pawl carrier 28 and the gear ring 21. As is best seen by simultaneous consideration of FIGS. 3 and 4, the free circumferential length of the recesses in the pawl carrier 28 engaged by the claws 29 is greater than the pitch of the ratchet gear or wheel 33. The angular lost motion between the ring gear 21 and the hub shell 7 is thus greater than the angular motion of the hub shell corresponding to the pitch of the ratchet gear 33, that is, to the motion of the hub shell through the angle defined with the axis of the shaft 1 by two successive teeth of the ratchet gear 33.

Upon transition from braking to backward rolling of the bicycle, free movement of the hub shell through the angle α is always possible. This movement is sufficient to cause engagement between a pawl 30 and a tooth of the ratchet 33. The threads connecting the planet carrier 19 with the brake actuating member 25 are inclined in such a direction that the threaded movement of the member 25 initiated by the engagement of the pawl 30 with a tooth of the ratchet gear 33 is in an axial direction toward the drive end of the shaft 1, thus releasing the brake before the hub shell moves through the angle α. Actually, this angle is sufficient to permit the brake ratchet to turn the member 25 during backward rolling of the bicycle until it abuts against the shoulder 27. Blocking of the brake is safely avoided.

During free-wheeling, the internal working elements of the hub are stationary. The hub shell 7 rotates freely on the ball bearings 6 and 9, and the remainder of the hub remains in the position shown in FIG. 1.

When tension applied to the linkage 14 moves the coupling sleeve 10 into the position shown in FIG. 2, driving power is transmitted from the sprocket 32 by means of the driver member 4, the coupling sleeve 10, and the ring gear 21 to the pawl carrier 28. The drive ratchet 31, 33 causes rotation of the hub shell 7.

During braking by back pedaling, power is transmitted from the ring gear 21 to the planet carrier 19. The braking force is thus augmented by the planetary gearing when arranged for direct transmission of driving force. In all other aspects, the apparatus functions in the same manner as described above for overdrive operation.

Obviously many modifications and variations of the present invention are possible in the light of the above teachings. Many other known brake arrangements may be substituted for the conical brake actuating member 25 and the cooperating slotted brake sleeve 26. Movement of the brake actuating member 25 between the operative and inoperative positions thereof does not necessarily require threaded engagement of the same with an axially fixed element of the hub assembly, but many other arrangements including radially and axially inclined cooperating cam faces will suitably shift the position of the brake actuating member.

Whether the pawl carrier which supports the drive pawls is mounted on the planet carrier hub, directly on the shaft 1, or on any other element of the device secured to the shaft is not essential to the more basic aspects of this invention. Mounting the pawl carrier on the planet carrier hub in the manner specifically disclosed is preferred because of the compact arrangement made possible thereby. Many advantages of the specific embodiment illustrated would be retained, however, if the pawl carrier were rotatably supported on the brake actuating member 25 or on the hub shell 7.

The manner in which the driver member 4 is alternatively coupled to different elements of the planetary gearing may also be varied. Coupling members of different types are well known, and lend themselves readily to adaptation for the purposes of this invention. Neither a planetary gearing nor the shifting mechanism specifically disclosed are at the core of this invention, and equivalent mechanisms well known to those skilled in the art may be substituted.

It should be understood, therefore, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In a dual speed hub for bicycles and the like including a shaft having an axis, and a hub shell rotatable on said shaft in a forward and a backward direction about said axis, in combination:

(a) a driver member rotatable about said axis in two opposite directions;
(b) gearing including a plurality of gear means in meshing engagement for rotation at different respective angular speeds about respective axes, said gear means being substantially secured against movement relative to each other in the direction of the respective axes thereof;
(c) coupling means interposed between said driver member and said gearing;
(d) means for shifting said coupling means between two positions in which said coupling means selectively couples said driver member to two of said gear means respectively;
(e) drive ratchet means rotatable about said axis and interposed between one of said gear means and said hub shell, said drive ratchet means including lost motion means for transmitting rotary movement between said one gear means and said hub shell with a predetermined angular lost motion of said hub shell about the axis of said shaft, said ratchet means transmitting movement from said driver member to said hub shell for forward rotation of the latter when said driver member rotates in one of said opposite directions;
(f) a brake member engageable with said hub shell for securing the same against rotation relative to said shaft;
(g) a brake actuating member movable between an operative position in which said actuating member urges said brake member into engagement with said hub shell, and an inoperative position;
(h) motion transmitting means for moving said brake actuating member from the inoperative toward the operative position thereof when said driver member rotates in the other one of said opposite directions; and
(i) brake ratchet means including ratchet wheel means having a predetermined pitch, said brake ratchet means being interposed between said brake actuating member and said hub shell for moving said brake actuating member from the operative to the inoperative position thereof when said hub shell rotates in a backward direction while said driver member is stationary relative to said shaft, the angle of rotation of said hub shell corresponding to said predetermined pitch being smaller than the angle of said predetermined angular motion.

2. In a dual speed hub as set forth in claim 1, said gearing being planetary gearing and said plurality of gear means including a sun gear mounted on said shaft and having an axis, a planet carrier rotatable about the axis of said sun gear, a planet gear rotatable on said carrier, and a ring gear, said planet gear meshing with said sun gear and said ring gear.

3. In a dual speed hub as set forth in claim 2, said one gear means being said ring gear.

4. In a dual speed hub as set forth in claim 3, said brake actuating member being threadedly mounted on said planet carrier for threaded movement between said operative and said inoperative positions thereof.

5. In a dual speed hub as set forth in claim 2, said drive ratchet means including carrier member rotatable about said axis, a ratchet arrangement including a ratchet gear member and a pawl member, one of the members of said ratchet arrangement being secured to said carrier member and the other one to said hub shell, and said lost motion means including a coupling connecting said carrier member to said ring gear for delayed transmission of rotary motion between said ring gear and said carrier member.

6. In a dual speed hub as set forth in claim 5, the coupling of said lost motion means being a claw coupling.

7. In a dual speed hub as set forth in claim 5, said carrier member being rotatably supported on said planet carrier.

8. In a dual speed hub as set forth in claim 2, said coupling when in said two positions thereof selectively coupling said driver member to said planet carrier and to said ring gear respectively.

9. In a dual speed hub as set forth in claim 1, said brake actuating member being threadedly movable relative to said shaft about the axis of the latter between said operative and said inoperative position.

10. In a dual speed hub as set forth in claim 9, said brake ratchet means having a first portion secured to said hub, and a second portion secured to said brake actuating member, one of said portions being said ratchet wheel means having said predetermined pitch, and the other member being a pawl engageable with said wheel for joint movement when said hub shell rotates in said backward direction.

11. In a dual speed hub as set forth in claim 1, said drive ratchet means and said brake ratchet means including respective pawls rotatable about said axis in axially juxtaposed planes, said hub shell carrying an axially elongated ratchet gear, respective axial portions of said gear being engageable by said pawls.

12. In a dual speed hub for bicycles and the like, in combination:
 (a) a shaft having an axis;
 (b) a hub shell rotatable on said shaft about said axis in a forward and in a backward direction;
 (c) a driver member rotatable on said axis in two opposite directions;
 (d) planetary gearing having a plurality of members including a sun gear coaxially mounted on said shaft, a planet carrier rotatable about said axis, a plurality of planet gears rotatable on said carrier, and a ring gear coaxial with said planet carrier, said planet gears meshing with said sun gear and said ring gear, said gears being substantially secured against relative axial movement;
 (e) coupling means connected to said driver member for joint rotation;
 (f) means for shifting said coupling means between two positions in which said coupling means selectively couples said driver member to two respective members of said planetary gearing;
 (g) drive ratchet means interposed between said ring gear and said hub shell, said drive ratchet means including a ratchet gear on said hub shell, a pawl engageable with said ratchet gear, and lost motion drive means operatively connected to said ring gear for rotating said pawl about said axis, the lost motion of said drive means corresponding to a predetermined angular motion of said hub shell about the axis of said shaft, and said ratchet means transmitting movement from said driver member to said hub shell for forward rotation of the latter when said driver member rotates in one of said opposite directions;
 (h) a brake member engageable with said hub shell for securing the same against rotation relative to said shaft;
 (i) a brake actuating member threadedly movable on said planet carrier about said axis between an operative position in which said actuating member urges said brake member into engagement with said hub shell, and an inoperative position;
 (j) motion transmitting means for moving said brake actuating member from the inoperative toward the operative position thereof when said driver member rotates in the other one of said opposite directions; and
 (k) brake ratchet means including a ratchet gear having a predetermined pitch and a pawl engageable with said ratchet gear, said brake ratchet means being interposed between said brake actuating member and said hub shell for moving said brake actuating member in a direction from the operative toward the inoperative position thereof when said hub shell rotates in a backward direction while said driver member is stationary relative to said shaft, the angle of rotation of said hub shell relative to said brake actuating member corresponding to said pitch being smaller than the angle of said predetermined angular motion.

13. In a dual speed hub as set forth in claim 12, said drive ratchet means including a pawl carrier rotatable about said axis, said pawl being mounted on said pawl carrier, and said lost motion drive means including a claw coupling loosely connecting said pawl carrier to said ring gear.

14. In a dual speed hub as set forth in claim 13, said pawl carrier being freely rotatable on said planet carrier.

15. In a dual speed hub as set forth in claim 12, the ratchet gear of said brake ratchet means being integral with the ratchet gear of said drive ratchet means, the respective pawls of said ratchet means being mounted for rotation about said axis in axially juxtaposed planes.

16. In a dual speed hub as set forth in claim 12, the two respective members of said planetary gearing selectively coupled by said coupling means to said driver member being said planet carrier and said ring gear.

References Cited in the file of this patent

UNITED STATES PATENTS

| 1,277,070 | Harrison | Aug. 27, 1918 |
| 2,895,576 | Schwerdhöfer | July 21, 1959 |
| 2,957,559 | Hood et al. | Oct. 25, 1960 |